(12) United States Patent
Kitamura et al.

(10) Patent No.: US 6,265,852 B1
(45) Date of Patent: Jul. 24, 2001

(54) EXCITATION CONTROLLER AND EXCITATION CONTROL METHOD FOR STABILIZING VOLTAGE IN ELECTRIC POWER SYSTEM

(75) Inventors: Hitomi Kitamura; Seiichi Tanaka; Masaru Shimomura, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/399,145

(22) Filed: Sep. 20, 1999

(30) Foreign Application Priority Data

Apr. 14, 1999 (JP) .................................. 11-106943

(51) Int. Cl.[7] .............................. H02P 9/10; H02P 9/14; H02P 9/00; H02H 7/06
(52) U.S. Cl. ............................. 322/59; 322/28; 322/20; 322/19
(58) Field of Search .................... 322/24, 19, 17, 322/20, 25, 45, 28, 59

(56) References Cited

U.S. PATENT DOCUMENTS

| | | | |
|---|---|---|---|
| 3,621,369 | * 11/1971 | Nagae | 322/19 |
| 4,245,182 | * 1/1981 | Aotsu et al. | 322/20 |
| 4,329,637 | * 5/1982 | Kotake et al. | 322/20 |
| 4,350,947 | * 9/1982 | Uenosono et al. | 322/17 |
| 4,701,689 | * 10/1987 | Yuan et al. | 322/58 |
| 4,714,869 | * 12/1987 | Onitsuka | 322/20 |
| 4,812,729 | * 3/1989 | Ito et al. | 318/732 |
| 4,816,696 | * 3/1989 | Sakayori et al. | 290/52 |
| 4,843,296 | * 6/1989 | Tanaka | 318/800 |
| 4,920,277 | * 4/1990 | Kuwabara et al. | 290/40 C |
| 5,148,093 | * 9/1992 | Bando et al. | 318/723 |
| 5,440,222 | * 8/1995 | Tanaka et al. | 322/25 |
| 5,604,420 | * 2/1997 | Nambu | 322/19 |
| 5,977,731 | * 11/1999 | Xia et al. | 318/147 |

FOREIGN PATENT DOCUMENTS 2809833   7/1998 (JP).

* cited by examiner

Primary Examiner—Nestor Ramirez
Assistant Examiner—Julio Cesar Gonzalez
(74) Attorney, Agent, or Firm—Leydig, Voit & Mayer, Ltd

(57) ABSTRACT

An excitation controller sets an output terminal reference voltage of a synchronous machine from a reactive current output from the synchronous machine and a high side reference voltage of a transformer, and controls the field current supplied to the field winding of the synchronous machine in response to the deviation between the reference voltage and the output terminal voltage. Although a conventional excitation controller can maintain the transmission voltage on the transmission bus at a fixed value, an expensive potential detector is needed for detecting the transmission voltage on the transmission bus, which increases the manufacturing cost of the excitation controller.

10 Claims, 5 Drawing Sheets

EXCITATION CONTROLLER AND EXCITATION CONTROL METHOD FOR STABILIZING VOLTAGE IN ELECTRIC POWER SYSTEM

BACKGROUND OF THE INVENTION

1. Field of the Invention

The present invention relates to an excitation controller and an excitation control method for stabilizing voltage in an electric power system.

2. Description of Related Art

FIG. 8 is a block diagram showing a conventional excitation controller disclosed in Japanese patent publication No. Hei. 10-2809833. In FIG. 8, the reference numeral 1 designates a synchronous machine; 2 designates a transformer; 3 designates a breaker; 4 designates a transmission line; 5 designates a transmission bus of a power plant; 6 designates a potential transformer (called "PT" from now on) for detecting an output terminal voltage $V_G$ of the synchronous machine 1; 7 designates a voltage setter for setting the output terminal reference voltage $r_G$ of the synchronous machine 1; 8 designates a subtracter for producing a deviation signal by subtracting the output terminal voltage $V_G$ from the reference voltage $r_G$ set by the voltage setter 7; and 9 designates a reduced gain circuit for multiplying the deviation signal fed from the subtracter 8 by a gain β.

The reference numeral 10 designates a potential device (called "PD" from now on) for detecting the transmission voltage $V_H$ on the transmission bus 5; 11 designates a high side voltage setter for setting a reference voltage $r_H$ of the transmission bus 5; 12 designates a subtracter for producing a deviation signal by subtracting the transmission voltage $V_H$ from the reference voltage $r_H$ set by the high side voltage setter 11; 13 designates a high side voltage control gain circuit for multiplying the deviation signal fed from the subtracter 12 by a gain $K_H$; 14 designates an adder for adding the multiplication result of the reduced gain circuit 9 and the multiplication result of the high side voltage control gain circuit 13; 15 designates an automatic voltage regulator (called "AVR" from now on) for controlling the rectifying timing of an exciter 16 using the addition result of the adder 14 as an input condition; 16 designates the exciter for supplying the field current to a field winding 17 of the synchronous machine 1 under the command of the AVR 15; and 17 designates the field winding of the synchronous machine 1.

Next, the operation of the conventional excitation controller will be described.

First, the PT 6 detects the output terminal voltage $V_G$ of the synchronous machine 1. Then, the subtracter 8 subtracts the output terminal voltage $V_G$ from the reference voltage $r_G$ set by the voltage setter 7, and outputs its subtraction result as the deviation signal, and the reduced gain circuit 9 multiplies the deviation signal by the gain β.

On the other hand, the PD 10 detects the transmission voltage $V_H$ of the transmission bus 5. Then, the subtracter 12 subtracts the transmission voltage $V_H$ from the reference voltage $r_H$ set by the high side voltage setter 11, and outputs its subtraction result as the deviation signal. The high side voltage control gain circuit 13 multiplies the deviation signal by the gain $K_H$.

Subsequently, the adder 14 adds the multiplication result of the reduced gain circuit 9 and the multiplication result of the high side voltage control gain circuit 13, and the AVR 15 generates a timing signal for controlling the rectifying timing of the exciter 16 using the addition result of the adder 14 as the input condition of the following transfer function.

transfer function=$K \cdot (1+T_{LD} \cdot S)/(1+T_{LG} \cdot S)$ where, K is the gain constant;

$T_{LD}$ and $T_{LG}$ are time constants; and

S is the Laplace operator.

In response to the timing signal fed from the AVR 15, the exciter 16 supplies the field current to the field winding 17 of the synchronous machine 1.

Incidentally, if the addition result of the adder 14 is positive, the field current supplied to the field winding 17 is increased so that the output terminal voltage $V_G$ of the synchronous machine 1 increases, whereas if the addition result of the adder 14 is negative, the field current supplied to the field winding 17 is decreased so that the output terminal voltage $V_G$ of the synchronous machine 1 decreases.

Thus, the voltage on the transmission bus 5 is maintained at a fixed value, and hence, even if an accident takes place on the transmission line 4, the voltage drop of the entire transmission system can be alleviated, which makes it possible to markedly improve the voltage stability.

With the foregoing configuration, the conventional excitation controller can maintain the transmission voltage $V_H$ on the transmission bus 5 at the fixed value. However, it has a problem of increasing the manufacturing cost because of the expensive PD 10 which is required for detecting the transmission voltage $V_H$ of the transmission bus 5.

Furthermore, since an excitation control cubicle, on which the AVR 15 and adder 14 are mounted, is usually installed far from the transmission bus 5, a long cable connecting the excitation control cubicle and the transmission bus 5 is needed and is susceptible to noise, and this presents the problem of reducing the reliability of the system.

SUMMARY OF THE INVENTION

The present invention is implemented to solve the foregoing problem. It is therefore an object of the present invention to provide an excitation controller and an excitation control method capable of maintaining the voltage on the transmission bus at a fixed value without detecting the voltage on the transmission bus.

According to a first aspect of the present invention, there is provided an excitation controller comprising: a voltage detector for detecting an output terminal voltage of a synchronous machine which is connected with a transmission system through a transformer; a reactive current detector for detecting a reactive current output from the synchronous machine; a voltage setter for setting an output terminal reference voltage of the synchronous machine from the reactive current detected by the reactive current detector and a high side reference voltage of the transformer; and a controller for controlling an excitation system of the synchronous machine in response to a deviation between the reference voltage set by the voltage setter and the output terminal voltage detected by the voltage detector.

Here, the voltage setter may set the output terminal reference voltage of the synchronous machine such that the high side voltage of the transformer agrees with the high side reference voltage when the reactive current detected by the reactive current detector agrees with a reference value.

The voltage setter may determine the reference value in accordance with the high side reference voltage of the transformer.

The voltage setter, when the high side reference voltage of the transformer is changed, may subtract from the reference voltage after the change the reference voltage before the change, divide a result of the subtraction by a reactance of the transmission system side, add a result of the division to the reference value before the change, and adopt a result of the addition as the reference value.

The voltage setter may estimate the reactance on the transmission system side when obtaining the reference value after the change.

The voltage setter may calculate the reference value from the reactive current detected by the reactive current detector and the high side voltage of the transformer.

According to a second aspect of the present invention, there is provided an excitation control method comprising the steps of: detecting an output terminal voltage of a synchronous machine which is connected with a transmission system through a transformer; detecting a reactive current output from the synchronous machine; setting an output terminal reference voltage of the synchronous machine from the reactive current detected and a high side reference voltage of the transformer; and controlling an excitation system of the synchronous machine in response to a deviation between the reference voltage and the output terminal voltage.

The step of setting may set the output terminal reference voltage of the synchronous machine such that the high side voltage of the transformer agrees with the high side reference voltage when the reactive current output from the synchronous machine agrees with a reference value.

The step of setting may determine the reference value in accordance with the high side reference voltage of the transformer.

The step of setting, when the high side reference voltage of the transformer is changed, may subtract from the reference voltage after the change the reference voltage before the change, divide a result of the subtraction by a reactance of the transmission system side, add a result of the division to the reference value before the change, and adopt a result of the addition as the reference value.

The step of setting may estimate the reactance on the transmission system side when obtaining the reference value after the change.

The step of setting may calculate the reference value from the reactive current output from the synchronous machine and the high side voltage of the transformer.

DETAILED DESCRIPTION OF THE PREFERRED EMBODIMENTS

The invention will now be described with reference to the accompanying drawings.

EMBODIMENT 1

Figure 1:
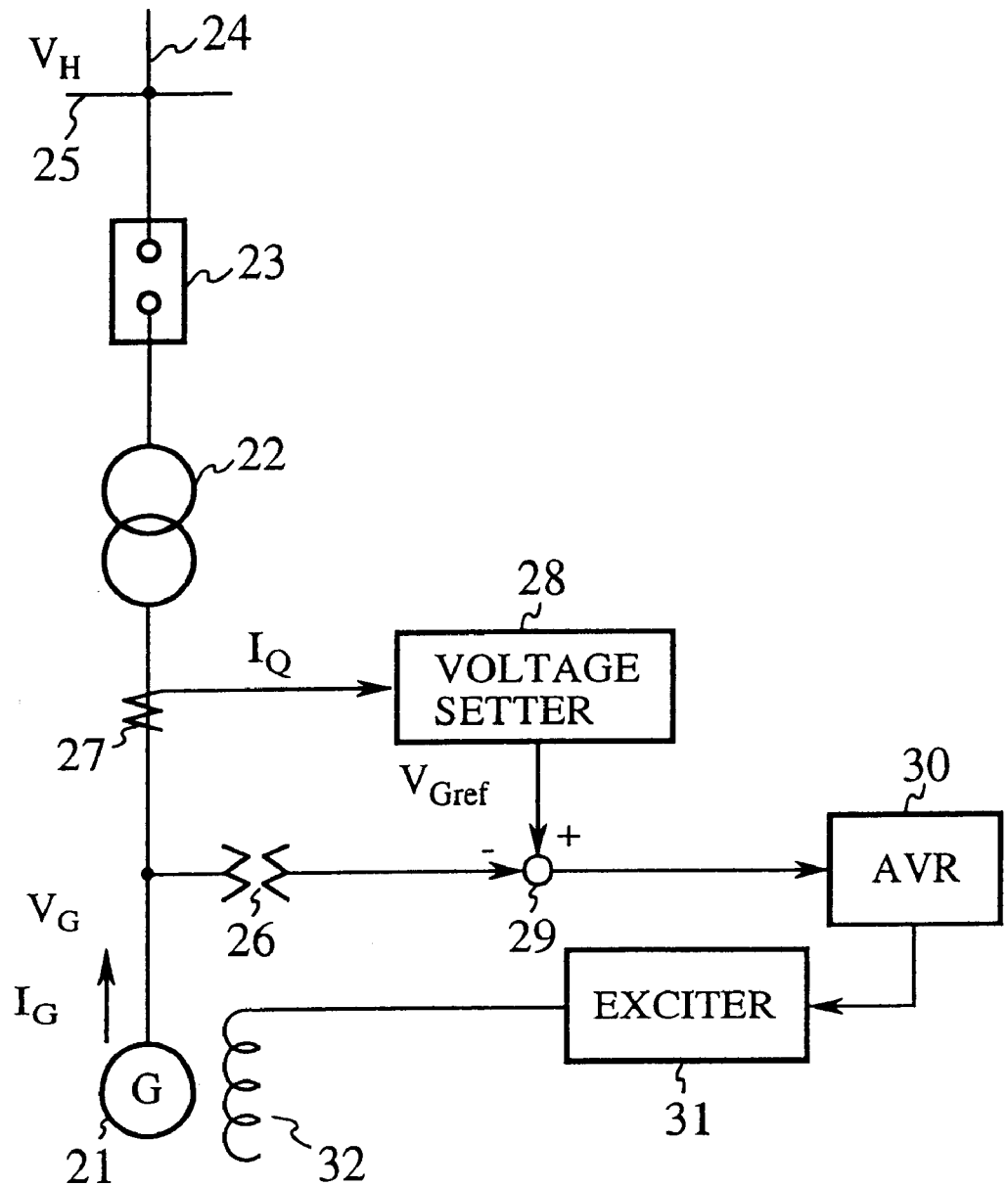
FIG. 1 is a block diagram showing an embodiment 1 of an excitation controller in accordance with the present invention.

FIG. 1 is a block diagram showing an embodiment 1 of an excitation controller in accordance with the present invention. In FIG. 1, the reference numeral 21 designates a synchronous machine; 22 designates a transformer; 23 designates a breaker; 24 designates a transmission line; 25 designates a transmission bus of a power plant; 26 designates a PT (potential transformer) for detecting the output terminal voltage $V_G$ of the synchronous machine 21; 27 designates a CT (current transformer) for detecting the reactive current $I_Q$ output from the synchronous machine 21; and 28 designates a voltage setter for setting the output terminal reference voltage $V_{Gref}$ in response to the reactive current $I_Q$ detected by the CT 27 and the high side reference voltage $V_{Href}$ of the transformer 22.

The reference numeral 29 designates a subtracter for subtracting from the reference voltage $V_{Gref}$, set by the voltage setter 28, the output terminal voltage $V_G$ detected by the PT 26, and for outputting the deviation signal; 30 designates an AVR (automatic voltage regulator) for controlling the rectifying timing of an exciter 31 using the deviation signal fed from the subtracter 29 as the input condition; 31 designates the exciter for supplying the field current to the field winding 32 of the synchronous machine 21 under the command of the AVR 30; and 32 designates the field winding of the synchronous machine 21.

Figure 2:
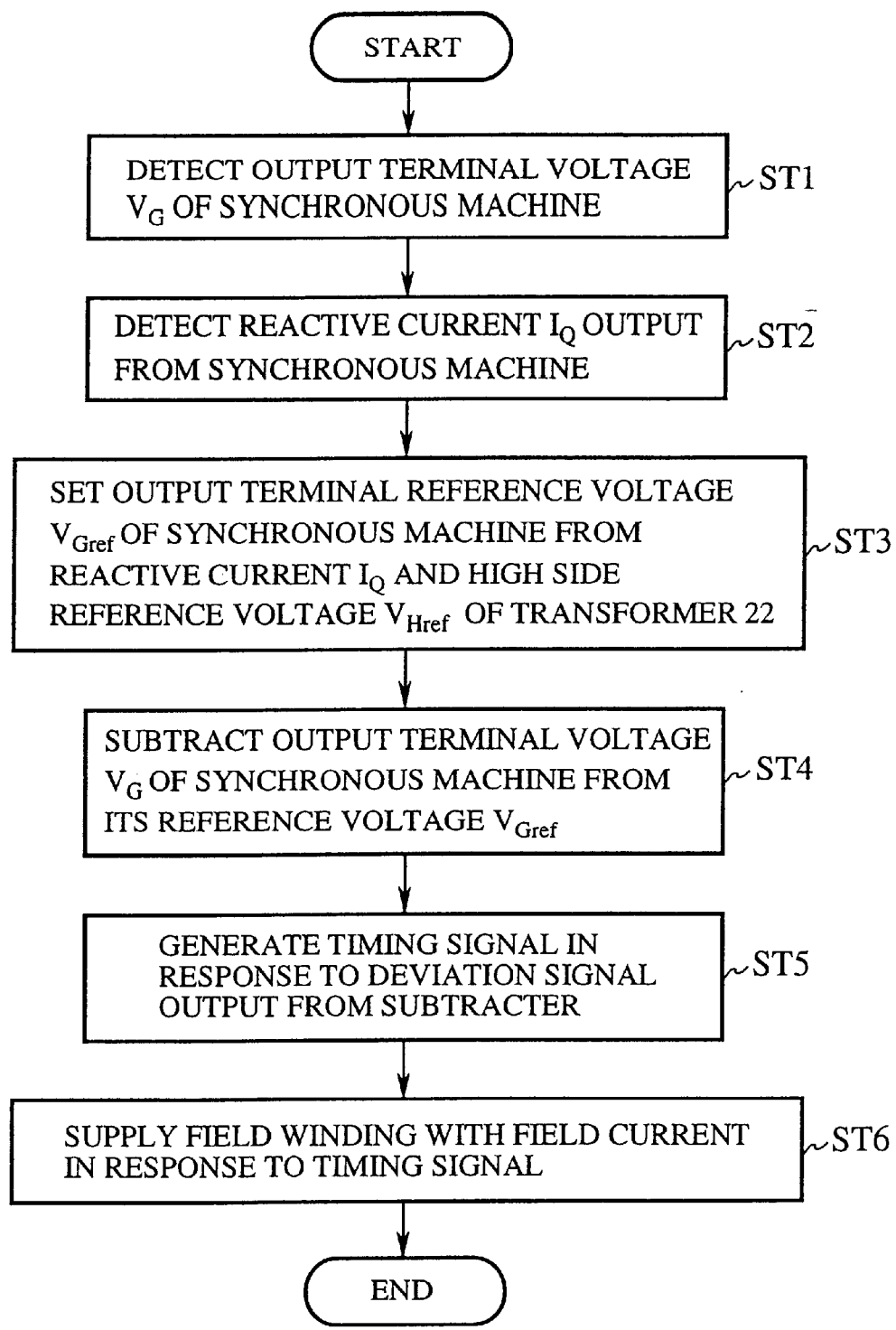
FIG. 2 is a flowchart illustrating an excitation control method of the embodiment 1 in accordance with the present invention.

Next, the operation of the present embodiment 1 will be described with reference to FIG. 2, the flowchart of an excitation control method of the embodiment 1 in accordance with the present invention, and FIGS. 3 and 4, system diagrams showing infinite bus model systems.

First, the PT 26 detects the output terminal voltage $V_G$ of the synchronous machine 21 (step ST1), and the CT 27 detects the reactive current $I_Q$ output from the synchronous machine 21 (step ST2).

Then, in response to the reactive current $I_Q$ detected by the CT 27, the voltage setter 28 sets the output terminal reference voltage $V_{Gref}$ from the reactive current $I_Q$ and the high side reference voltage $V_{Href}$ of the transformer 22 (step ST3).

Figure 3:
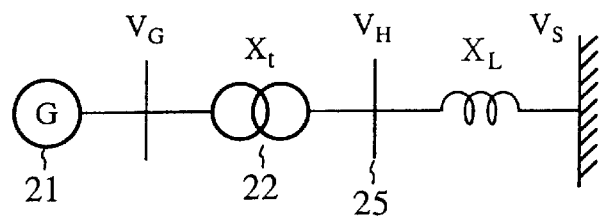
FIG. 3 is a system diagram showing an infinite bus model system.

More specifically, since the output terminal voltage $V_G$ of the synchronous machine 21 has the relationship of equation (1) with the high side voltage $V_H$ of the transformer 22, where $X_t$ of equation (1) is the reactance of the transformer 22, the output terminal reference voltage $v_{Gref}$ can be expressed as equation (2) (see, FIG. 3).

$$V_G = V_H + X_t \cdot I_Q \tag{1}$$

$$V_{Gref} = V_{Href} + X_t \cdot I_Q \tag{2}$$

Accordingly, substituting into (2) the reactive current $I_Q$ output from the synchronous machine 21 and the high side reference voltage $V_{Href}$ of the transformer 22 yields the output terminal reference voltage $V_{Gref}$ of the synchronous machine 21.

However, as clearly seen from FIG. 3, equation (2) assumes that only one synchronous machine 21 is connected to the transmission system, and fully (100%) compensates for the reactance $X_t$ of the transformer 22.

Figure 4:
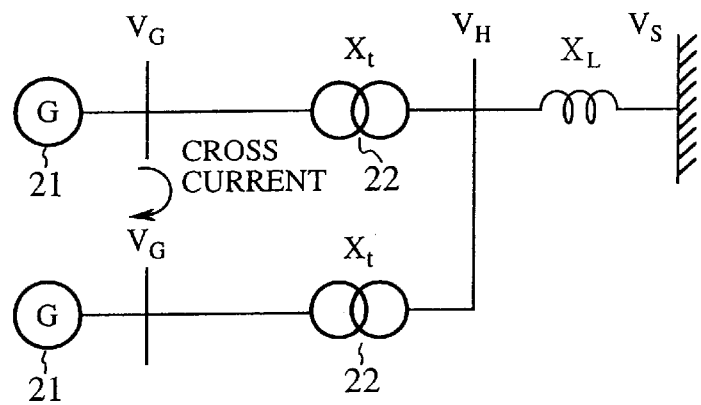
FIG. 4 is a system diagram showing another infinite bus model system.

As a result, when a plurality of synchronous machines 21 are connected to the transmission system as shown in FIG. 4, the reactance between the synchronous machine 21 and the other synchronous machines becomes nearly zero, so that the synchronous machine 21 is overloaded because of the cross current caused by the voltage difference and response difference between the output terminal voltages $V_G$ of the synchronous machines.

To suppress such a cross current, the present embodiment 1 subtracts from the reactance $X_t$ of the transformer 22 the reactance $X_{DR}$ corresponding to the suppressed component of the cross current as shown in equation (3). Here, although the reactance $X_{DR}$ corresponding to the suppressed component of the cross current is set at a few percent of the reactance $X_t$ of the transformer 22, its actual value is determined empirically.

$$V_{Gref} = V_{Href} + (X_t - X_{DR}) \cdot I_Q \qquad (3)$$

Thus, the voltage setter 28 calculates the output terminal reference voltage $V_{Gref}$ of the synchronous machine 21 by substituting into equation (3) the reactive current $I_Q$ output from the synchronous machine 21 and the high side reference voltage $V_{Href}$ of the transformer 22.

After the voltage setter 28 sets the output terminal reference voltage $V_{Gref}$ of the synchronous machine 21, the subtracter 29 subtracts from the reference voltage $V_{Gref}$ set by the voltage setter 28 the output terminal voltage $V_G$ of the synchronous machine 21 detected by the PT 26, thereby outputting the subtraction result as the deviation signal (step ST4).

The AVR 30 generates a timing signal for controlling the rectifying timing of the exciter 31 in response to the deviation signal fed from the subtracter 29 using the deviation signal as the input condition of the following transfer function (step ST5).

transfer function=$K \cdot (1+T_{LD} \cdot S)/(1+T_{LG} \cdot S)$ where K is a gain constant;

$T_{LD}$ and $T_{LG}$ are time constants; and

S is the Laplace operator.

In response to the timing signal fed from the AVR 30, the exciter 31 supplies the field current to the field winding 32 of the synchronous machine 21 (step ST6).

Incidentally, if the deviation signal output from the subtracter 29 is positive, the field current fed to the field winding 32 is increased so that the output terminal voltage $V_G$ of the synchronous machine 21 increases, whereas if the deviation signal output from the subtracter 29 is negative, the field current fed to the field winding 32 is decreased so that the output terminal voltage $V_G$ of the synchronous machine 21 decreases.

Figure 5:
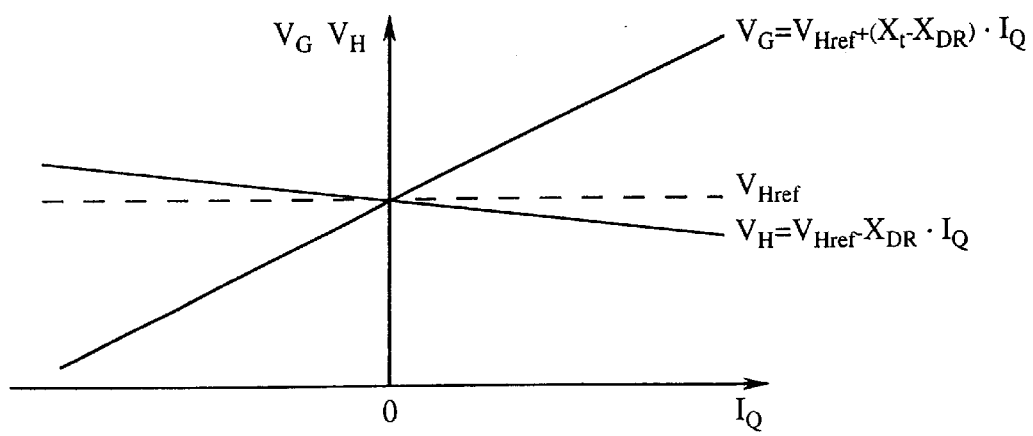
FIG. 5 is a graph illustrating the relationships between the output terminal voltage $V_G$ of a synchronous machine 21, the high side voltage $V_H$ of a transformer 22, and the high side reference voltage $V_{Href}$ of the transformer 22.

In this way, the output terminal voltage $V_G$ of the synchronous machine 21 is controlled such that it agrees with the reference voltage $V_{Gref}$, and the high side voltage $V_H$ of the transformer 22 is controlled such that it agrees with the reference voltage $V_{Href}$. In this case, there are relationships as illustrated in FIG. 5 between the output terminal voltage $V_G$ of the synchronous machine 21, the high side voltage $V_H$ of the transformer 22 and the high side reference voltage $V_{Href}$ of the transformer 22.

$$V_G = V_{Href} + (X_t - X_{DR}) \cdot I_Q \qquad (4)$$

$$V_H = V_{Href} - X_{DR} \cdot I_Q \qquad (5)$$

As described above, the embodiment 1 sets the output terminal reference voltage $V_{Gref}$ of the synchronous machine 21 in response to the reactive current $I_Q$ output from the synchronous machine 21 and the high side reference voltage $V_{Href}$ of the transformer 22, and controls the field current to be supplied to the field winding 32 of the synchronous machine 21 in accordance with the deviation between the reference voltage $V_{Gref}$ and the output terminal voltage $V_G$. This makes it possible to maintain the voltage on the transmission bus 25 without detecting the voltage on the transmission bus 25, and to obviate the necessity of installing the expensive PD for detecting the voltage on the transmission bus 25, thereby offering an advantage of limiting manufacturing cost.

Furthermore, since it is unnecessary to connect the PD through the cable the for detecting the voltage on the transmission bus 25 to the excitation control cubicle on which the AVR 30 and the like are mounted, the present embodiment is not susceptible to noise, thereby offering an advantage of improved reliability.

Moreover, because the PD 10, which was always connected to the transmission bus in the live state in the conventional system, become unnecessary the present embodiment 1 has an advantage of enabling checking and maintenance of the AVR 30 to be carried out in a no-voltage state while the synchronous machine 21 is halted.

EMBODIMENT 2

The foregoing embodiment 1 sets the output terminal reference voltage $V_{Gref}$ of the synchronous machine 21 by substituting into equation (3) the reactive current $I_Q$ output from the synchronous machine 21 and the high side reference voltage $V_{Href}$ of the transformer 22. In this case, as illustrated by (1) of FIG. 6, the high sidevoltage $V_H$ of the transformer 22 agrees with the reference voltage $V_{Href}$ only when the reactive current $I_Q = 0$.

However, when the generation system is in the normal mode, because the reactive current $I_Q \neq 0$, it is impossible for the high side voltage $V_H$ of the transformer 22 to be made always equal to the reference voltage $V_{Href}$.

Figure 6:
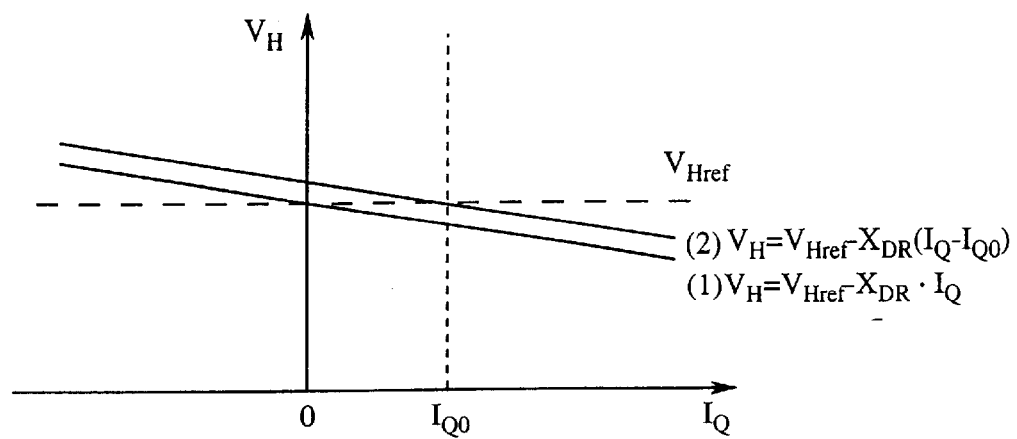
FIG. 6 is a graph illustrating the relationships between the reactive current $I_Q$ output from the synchronous machine 21, the high side reference voltage $V_{Href}$ of the transformer 22, and the high side voltage $V_H$ of the transformer 22.

In view of this, the present embodiment 2 sets the output terminal reference voltage $V_{Gref}$ of the synchronous machine 21 such that the high side voltage $V_H$ of the transformer 22 agrees with the reference voltage $V_{Href}$ when the reactive current $I_Q$ output from the synchronous machine 21 agrees with a particular reference value $I_{Q0}$ (see, (2) of FIG. 6). Although the reference value $I_{Q0}$ is determined in accordance with the high side reference voltage $V_{Href}$ of the transformer 22, the determination thereof will be described in an embodiment 3 and onward.

Specifically, the output terminal reference voltage $V_{Gref}$ of the synchronous machine 21 is set by including the reactive current $I_Q$ output from the synchronous machine 21 and the high side reference voltage $V_{Href}$ of the transformer 22 as shown in the following equation (6).

$$V_{Gref} = V_{Href} + (X_t - X_{DR}) \cdot I_Q + X_{DR} \cdot I_{Q0} \qquad (6)$$

in which case, the output terminal voltage $V_G$ of the synchronous machine 21 and the high side voltage $V_H$ of the transformer 22 can be expressed as follows:

$$V_G = V_{Href} + (X_t - X_{DR}) \cdot I_Q + X_{DR} \cdot I_{Q0} \qquad (7)$$

$$V_H = V_{Href} - X_{DR}(I_Q - I_{Q0}) \qquad (8)$$

According to the present embodiment 2, the output terminal reference voltage $V_{Gref}$ of the synchronous machine 21 is set such that the high side voltage $V_H$ of the transformer 22 agrees with the reference voltage $V_{Href}$ when the reactive current $I_Q$ output from the synchronous machine 21 equals the reference value $I_{Q0}$. This offers an advantage of being able to match the high side voltage $V_H$ of the transformer 22 with the reference voltage $V_{Href}$ more precisely than in the embodiment 1.

EMBODIMENT 3

Although the foregoing embodiment 2 employs the reference value $I_{Q0}$ corresponding to the high side reference voltage $V_{Href}$ of the transformer 22, if the reference voltage $V_{Href}$ is changed from $V_{Hrf1}$ to $V_{Href2}$ in an operation mode in which the reference value $I_{Q0}=I_{Q01}$ and the high side reference voltage of the transformer 22 $V_{Href}=V_{Href1}$ (when the reactive current $I_Q=I_{Q1}$, and the high side voltage of the transformer 22 $V_H=V_{H1}$), the high side voltage $VH_2$ of the transformer 22 is expressed as follows because the reactive current $I_Q$ also changes from $I_{Q1}$ to $I_{Q2}$.

$$VH_2=V_{Href2}-X_{DR}(I_{Q2}-I_{Q01}) \quad (9)$$

However, because $I_{Q2} \neq I_{Q01}$ in equation (9), the high side voltage $VH_2$ of the transformer 22 does not agree with the altered reference voltage $V_{Href2}$.

In view of this, the present embodiment 3 employs the reference value $I_{Q02}$ corresponding to the altered reference voltage $V_{Href}$ so as to match the high side voltage $V_{H2}$ of the transformer 22 to the altered reference voltage $V_{Href2}$.

More specifically, as expressed by the following equation, the reference value $I_{Q02}$ is obtained by subtracting from the reference voltage $V_{Href2}$ the reference voltage $V_{Href1}$, followed by dividing the result of the subtraction by the reactance $X_L$ of the transmission line 24, and by adding the result of the division to the reference value $I_{Q01}$.

$$I_{Q02}=I_{Q01}+(V_{Href2}-V_{Href1})/X_L \quad (10)$$

Thus, the altered output terminal reference voltage $V_{Gref2}$ of the synchronous machine 21 becomes as follows.

$$V_{Gref2}=V_{Href2}+(X_t-X_{DR}) \cdot I_{Q2}+X_{DR} \cdot I_{Q02} \quad (11)$$

According to the present embodiment 3, because the reference value $I_{Q0}$ corresponding to the high side reference voltage $V_{Href}$ of the transformer 22 is used, it has an advantage of being able to maintain the voltage of the transmission system at a fixed value even if the reference voltage $V_{Href}$ of is changed.

EMBODIMENT 4.

Although it is assumed in the foregoing embodiment 3 that the reactance $X_L$ Of the transmission line 24 is a known value, the reactance $X_L$ can be successively estimated because it can vary from moment to moment.

More specifically, because the effective power P and reactive power Q of the synchronous machine 21 can be expressed by the following equations (12) and (13), the reactance $X_L$ of the transmission line 24 can be obtained by eliminating the phase angle δ from equations (12) and (13).

$$P=V_G \cdot E_{fd} \sin \delta/(X_d+X_L) \quad (12)$$

$$Q=E_{fd}^2 \cdot X_L/(X_d+X_L)^2-(X_L-X_d) \cdot E_{fd} \cos \delta/(X_d+X_L)^2-X_d/(X_d+X_L)(13)$$

where $X_d$ is a synchronous reactance, and $E_{fd}$ is an internal voltage behind the synchronous reactance.

Because the present embodiment 4 determines the reference value $I_{Q0}$ by always using the accurate reactance $X_L$, it has an advantage of being able to match the high side voltage $V_H$ of the transformer 22 to the reference voltage $V_{Href}$ at high accuracy.

EMBODIMENT 5

Figure 7:
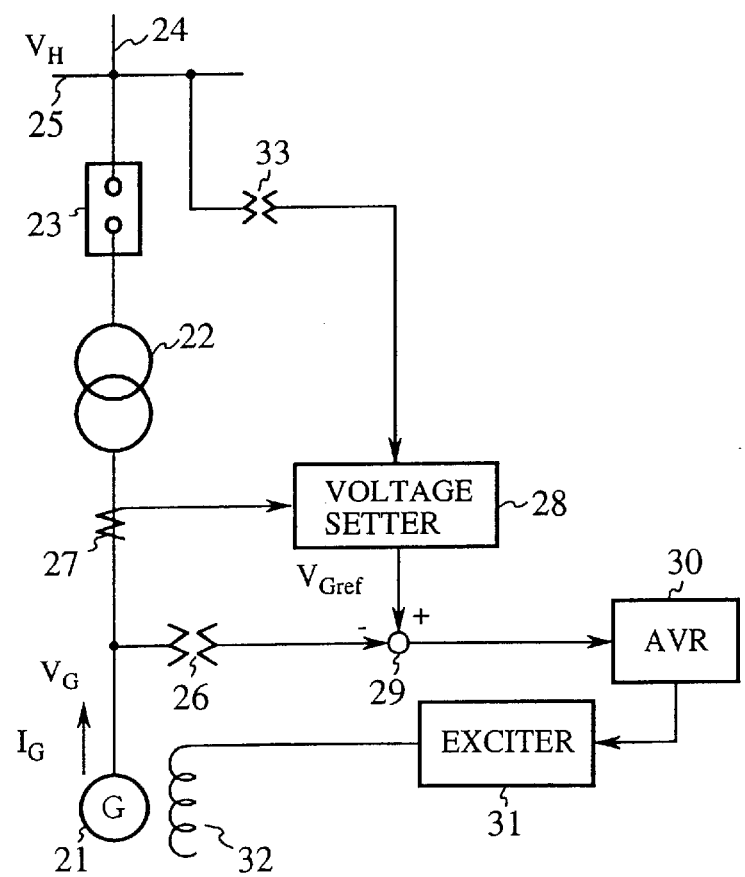
FIG. 7 is a block diagram showing an embodiment 5 of the excitation controller in accordance with the present invention.
Figure 8:
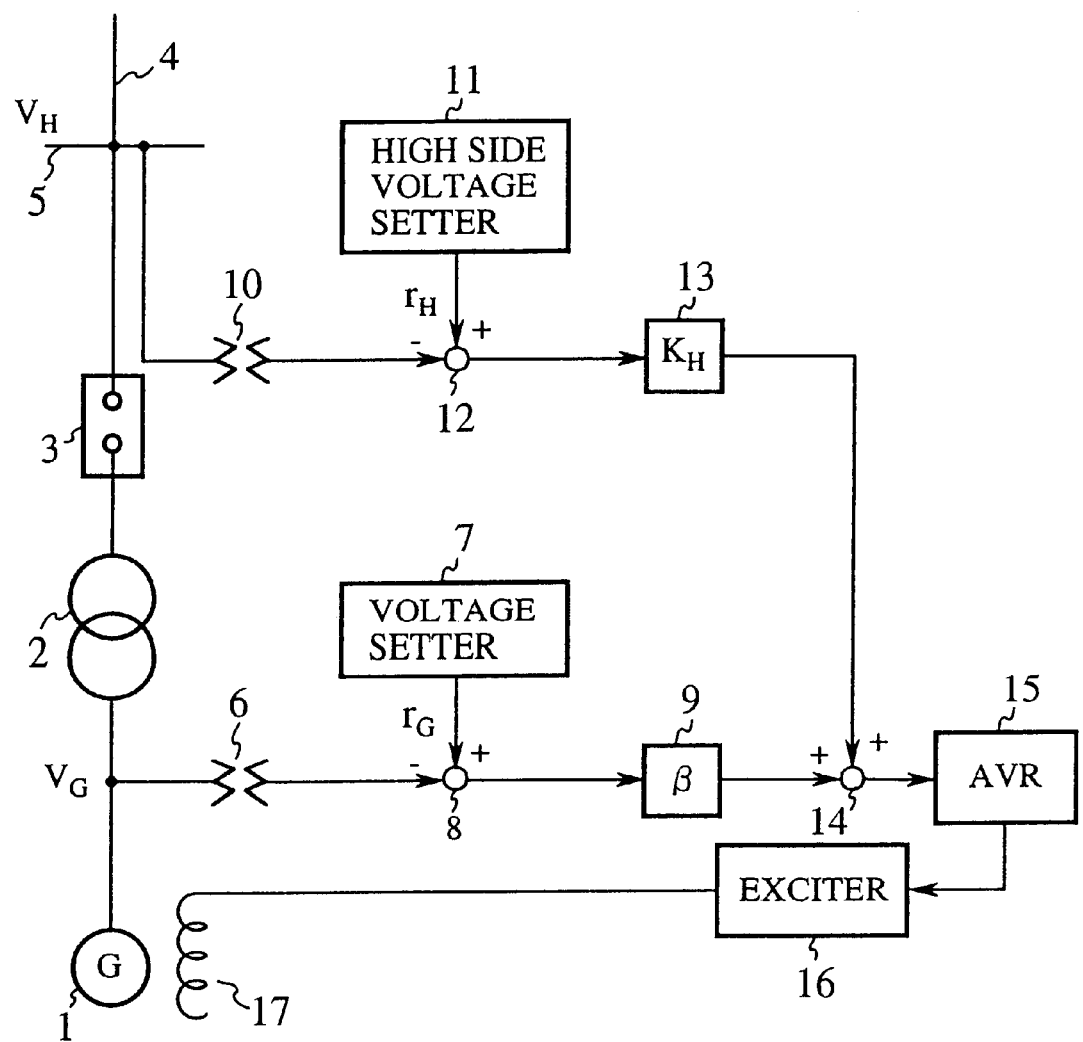
FIG. 8 is a block diagram showing a conventional excitation controller.

Although the foregoing embodiment 3 calculates the altered reference value $I_{Q02}$ using equation (10) when changing the high side reference voltage $V_{Href}$ of the transformer 22 from $V_{Href1}$ to $V_{Href2}$, this is not essential. For example, the voltage setter 28 can calculate the altered reference value $I_{Q02}$ from the reactive current $I_{Q2}$ output from the synchronous machine 21 and the high side voltage $V_{H2}$ of the transformer 22 measured by a PD 33 as shown FIG. 7.

$$I_{Q02}=I_{Q2}-(V_{Href2}-V_{H2})/X_{DR} \quad (14)$$

What is claimed is:

1. An excitation controller comprising:
a voltage detector for detecting an output terminal voltage of a synchronous machine, the synchronous machine being connected to a low voltage side of a transformer, the transformer having a high voltage side where a high side voltage is produced and that is connected to a transmission system including a transmission line;
a reactive current detector for detecting a reactive current output from the synchronous machine;
a voltage setter for setting an output terminal reference voltage of the synchronous machine from the reactive current detected by the reactive current detector and a high side reference voltage of the transformer; and
a controller for controlling an excitation system of the synchronous machine in response to a deviation between the reference voltage set by the voltage setter and the output terminal voltage detected by the voltage detector, wherein the voltage setter sets the output terminal reference voltage of the synchronous machine such that the high side voltage of the transformer matches the high side reference voltage when the reactive current detected by the reactive current detector matches a reference current.

2. The excitation controller according to claim 1, wherein the voltage setter determines the reference current in accordance with the high side reference voltage of the transformer.

3. The excitation controller according to claim 2, wherein the voltage setter, when the high side reference voltage of the transformer is changed, subtracts the high side reference voltage before the change from the high side reference voltage after the change to produce a difference voltage, divides the difference voltage by a reactance of the transmission line to produce a changed reactive current, adds the changed reactive current to the reference current before the change to produce a summed current, and adopts the summed current as the reference current.

4. The excitation controller according to claim 3, wherein the voltage setter estimates the reactance of the transmission line when obtaining the reference current after the change.

5. The excitation controller according to claim 1, wherein said voltage setter calculates the reference current from the reactive current detected by the reactive current detector and the high side voltage of the transformer.

6. An excitation control method comprising:
detecting an output terminal voltage of a synchronous machine, the synchronous machine being connected to a low voltage side of a transformer, the transformer having a high voltage side where a high side voltage is produced and that is connected to a transmission system including a transmission line;

detecting a reactive current output from the synchronous machine;

setting an output terminal reference voltage of the synchronous machine from the reactive current detected and a high side reference voltage of the transformer; and controlling an excitation system of the synchronous machine in response to a deviation between the reference voltage and the output terminal voltage, wherein setting includes setting the output terminal reference voltage of the synchronous machine such that the high side voltage of the transformer matches the high side reference voltage when the reactive current output from the synchronous machine matches a reference current.

7. The excitation control method according to claim 6, wherein setting includes determining the reference current in accordance with the high side reference voltage of the transformer.

8. The excitation control method according to claim 7, wherein setting, when the high side reference voltage of the transformer is changed, includes subtracting the high side reference voltage before the change from the high side reference voltage after the change to produce a difference voltage, dividing the difference voltage by a reactance of the transmission line to produce a changed reactive current, adding the changed reactive current to the reference current before the change to produce a summed current, and adopting the summed current as the reference current.

9. The excitation control method according to claim 8, wherein setting includes estimating the reactance of the transmission line when obtaining the reference current after the change.

10. The excitation control method according to claim 6, wherein setting including calculating the reference current from the reactive current output from the synchronous machine and the high side voltage of the transformer.

* * * * *